United States Patent
Iacovangelo et al.

(10) Patent No.: US 8,110,301 B2
(45) Date of Patent: Feb. 7, 2012

(54) ENERGY STORAGE DEVICE AND CELL CONFIGURATION THEREFOR

(75) Inventors: Charles Dominic Iacovangelo, Clifton Park, NY (US); David Charles Bogdan, Jr., Scotia, NY (US); Richard Louis Hart, Schenectady, NY (US); Andrew Philip Shapiro, Schenectady, NY (US); Steven Alfred Tysoe, Ballston Spa, NY (US); Michael Alan Vallance, Albany, NY (US); Guillermo Daniel Zappi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1186 days.

(21) Appl. No.: 11/763,083

(22) Filed: Jun. 14, 2007

(65) Prior Publication Data

US 2008/0145749 A1  Jun. 19, 2008

Related U.S. Application Data

(60) Provisional application No. 60/870,843, filed on Dec. 19, 2006.

(51) Int. Cl.
*H01M 2/18* (2006.01)
*H01M 4/13* (2010.01)

(52) U.S. Cl. .................... 429/130; 429/229

(58) Field of Classification Search .............. 429/129, 429/130, 229
See application file for complete search history.

(56) References Cited

U.S. PATENT DOCUMENTS

| | | | |
|---|---|---|---|
| 4,358,516 A | 11/1982 | Lange | |
| 4,382,117 A | 5/1983 | Kunze | |
| 4,447,376 A | 5/1984 | Chobanov et al. | |
| 4,476,204 A * | 10/1984 | Auborn | 429/345 |
| 4,894,298 A | 1/1990 | Vukson et al. | |
| 4,894,299 A | 1/1990 | Morse | |
| 4,895,776 A | 1/1990 | Virkar et al. | |
| 4,910,105 A | 3/1990 | Tilley et al. | |
| 4,913,754 A | 4/1990 | Duncan et al. | |
| 4,945,012 A | 7/1990 | Bugga et al. | |
| 4,992,345 A * | 2/1991 | Meintjes et al. | 429/103 |
| 5,134,044 A * | 7/1992 | Megerle | 429/104 |
| 5,194,343 A | 3/1993 | Bloom et al. | |
| 5,476,733 A * | 12/1995 | Coetzer et al. | 429/103 |
| 5,532,078 A * | 7/1996 | Redey et al. | 429/104 |
| 5,554,457 A | 9/1996 | Bugga et al. | |

(Continued)

FOREIGN PATENT DOCUMENTS

EP        0642186 A1       3/1995

(Continued)

OTHER PUBLICATIONS

PCT International Search Report dated Dec. 12, 2008.

(Continued)

*Primary Examiner* — Patrick Ryan
*Assistant Examiner* — Muhammad Siddiquee
(74) *Attorney, Agent, or Firm* — Richard A. DeCristofaro

(57) ABSTRACT

An article is provided. The article may include an electrochemical cell. The cell may include a molten electrolyte, and at least one molten electrode. The cell may include a structure for separating an anode from a cathode, while enabling ionic communication between the anode and cathode. An energy storage device comprising the article is also provided. Methods related to the article and the energy storage device may be provided.

49 Claims, 4 Drawing Sheets

U.S. PATENT DOCUMENTS

| | | | |
|---|---|---|---|
| 6,007,943 | A | 12/1999 | Coetzer |
| 6,117,807 | A | 9/2000 | Virkar et al. |
| 6,632,763 | B2 | 10/2003 | Virkar et al. |
| 2005/0153197 | A1* | 7/2005 | Coffey et al. ............ 429/94 |
| 2008/0079563 | A1 | 4/2008 | Crisafulli |
| 2008/0145755 | A1 | 6/2008 | Iacovangelo et al. |

FOREIGN PATENT DOCUMENTS

| | | |
|---|---|---|
| GB | 2094544 A | 9/1982 |
| GB | 2230640 A | 10/1990 |
| JP | 56057256 A | 5/1981 |
| JP | 56096464 A | 8/1981 |
| JP | 58154176 A | 9/1983 |
| WO | WO2005117189 A2 | 12/2005 |
| WO | WO2008079563 A2 | 7/2008 |

OTHER PUBLICATIONS

Parthasarthy et al., "High Temperature Sodium—Zinc Chloride Batteries With Sodium Beta—Alumina Solid Electrolyte", 1 page, Retrieved from the Internet:< URL: http://ecsmeet3.peerx-press.org/ms_files/ecsmeet3/2006/11/27/00000574/00/574_0_art_0 j9ezlk.pdf>.

Tao, "V.9 A High Temperature (400 to 650°C) Secondary Storage Battery Based on Liquid Sodium and Potassium Anodes", V. Advanced Research, Office of Fossil Energy Fuel Cell Program, pp. 1-4, FY 2006 Annual Report.

* cited by examiner

ENERGY STORAGE DEVICE AND CELL CONFIGURATION THEREFOR

CROSS REFERENCE TO RELATED APPLICATIONS

This application claims the priority and benefit of U.S. Provisional Application No. 60/870,843, entitled "ENERGY STORAGE DEVICE AND METHOD" filed on Dec. 19, 2006, which is incorporated herein by reference in its entirety.

BACKGROUND

1. Technical Field

The invention may include embodiments that relate to an article for use as a molten salt electrochemical cell. The invention may include embodiments that relate to a method of using the electrochemical cell, and to an energy storage device that includes the electrochemical cell.

2. Discussion of Related Art

A variety of rechargeable batteries and battery chemistries are presently available. Sodium/sulfur (NaS) and lithium/sulfur (LiS) batteries are two the commercially available molten salt batteries. The first commercial battery produced was the Sodium/sulfur battery having liquid sulfur for the positive electrode and a ceramic tube of beta-alumina separator electrolyte (BASE) for the separator. Corrosion of the insulators may be problematic in the harsh chemical environments typically found in such batteries. This may result in the insulators gradually becoming conductive thereby increasing the self-discharge rate.

It may be desirable to have a molten salt electrochemical cell that has different chemistry than those electrochemical cells that are currently available. It may be desirable to have an energy storage device that differs from those methods that are currently available. It may be desirable to have an energy storage device that differs from those devices that are currently available.

BRIEF DESCRIPTION

In one embodiment, an article is provides that includes a separator having a first surface that defines at least a portion of a first chamber, and a second surface that defines a second chamber. The first chamber is in ionic communication with the second chamber through the separator. A cathodic material is in electrical communication with the separator and capable of forming a metal halide. A support structure is disposed within at least one of the first chamber or the second chamber. The support structure is electrically conductive and in electrical communication with a current collector. The cathodic material is supported on a surface of the support structure.

Embodiments of the invention further provide an energy storage device and an energy management system that include the article. A method of making and/or using the article is provided.

BRIEF DESCRIPTION OF THE DRAWING FIGURES

FIGS. 3A-3J form an array of designs for use in embodiments of the invention.

Figure 4:
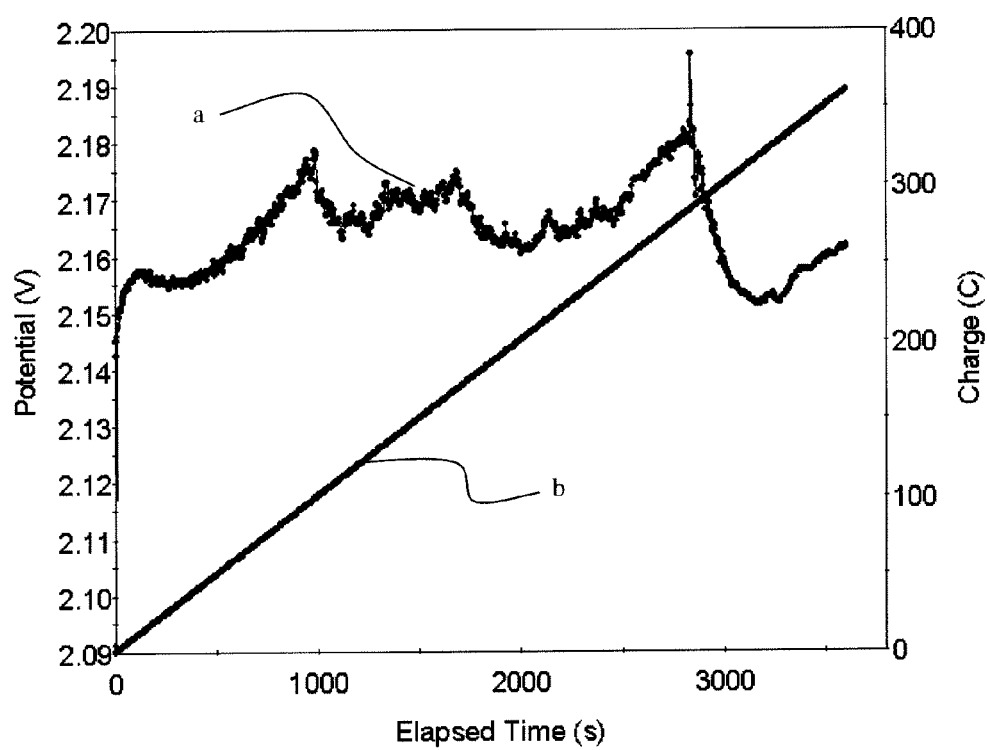

FIG. 4 illustrates a graph of a charging curve for Zn coated RVC foam in a $ZnCl_2$:NaCl melt at 100 $mA/cm^2$.

DETAILED DESCRIPTION

The invention may include embodiments that relate to an article for use as a molten salt electrochemical cell. The invention may include embodiments that relate to a method of using the electrochemical cell, and to an energy storage device that includes the electrochemical cell.

In one embodiment, an article is provides that includes a separator having a first surface that defines at least a portion of a first chamber, and a second surface that defines a second chamber. The first chamber is in ionic communication with the second chamber through the separator. A cathodic material is in electrical communication with the separator and capable of forming a metal halide. A support structure is disposed within at least one of the first chamber or the second chamber. The cathodic material is supported on a surface of the support structure.

Suitable separators may have any of a variety of geometries depending on the application. For example, some separators may be generally planar, or may have a domed or dimpled geometry. A planar, domed, or dimpled geometry may be useful in a button-type battery. Other separators may be undulate, corrugated, or reticulated. Still other separators may be cylindrical, spherical, ellipsoidal, conical, any other appropriate geometry, or any combination thereof. Some separators may be closed surfaces, but others may include open surfaces in combination with structures that may serve to close the surface. For example, in one embodiment the separator may be generally cylindrical and have one or more open ends. However, the open ends may seal against the housing or a lid, and therefore separation between a first and second chamber can be maintained. With further reference to the separator, it may have a cross-sectional profile normal to an axis that is a rectangle, an ellipse, a triangle, a polygon, a cross, or a star. Alternatively, the cross-sectional profile may be a cloverleaf, a circle, or a square. As the profile may differ depending on where the cross-sectional slice is made, the separator may have two or more of the cross-sectional profiles based on the location of the slice.

The separator may resist mechanical damage due to thermal cycling, pressure differential, and/or vibration. In one embodiment, added mechanical strength results from a thicker separator. However, a thicker wall may result in performance degradation due to increased resistivity. In another embodiment, the separator may resist mechanical damage due to changes in its composition, inclusion of additives, modifications to method of manufacture, or the like. Optionally, some embodiments may include features that increase ionic conductivity such as larger pore sizes, dopants, and/or coatings that promote ion flow. In some embodiments these features may compensate for conductivity losses that result from features that strengthen the separator.

The separator may be elongate and define an axis. The first chamber may be coaxially disposed about the axis. The separator may include two or more regions spaced axially and/or radially relative to each other. Some embodiments may include a combination of radial zones and axial regions. According to one embodiment, the concentration, presence, and/or type of components may vary continuously, discontinuously, or according to a predetermined pattern from a first axial region to a second axial region, or from a first radial zone to a second radial zone.

Adjacent to a surface of the separator is the support structure, which may extend away from that separator surface. The support structure may extend away from the separator surface to a thickness that is greater than about 0.1 millimeters. In one embodiment, the thickness is in a range of from about 0.1 millimeters to about 0.2 millimeters, from about 0.2 millimeters to about 0.5 millimeters, from about 0.5 millimeters to about 0.6 millimeters, from about 0.6 millimeters to about 1 millimeter, from about 1 millimeter to about 5 millimeters, from about 5 millimeters to about 10 millimeters, or from about 10 millimeters to about 20 millimeters. In embodiments including larger-capacity energy storage devices, the thickness may be larger than 20 millimeters.

The support structure can be a continuous matrix or a solid structure. In either instance, the support structure is electrically conductive and in electrical communication with a current collector. If a powder is used, a relatively electrically insulative salt layer may form around the powder particles during use, electrically isolating them from each other (electrically discontinuous) and from the current collector (electrically isolated). Therefore, in embodiments using a powder support structure the cathodic material and supporting electrolyte may be selected such that no relatively electrically insulative salt layer forms based on the state of charge—either no layer is formed, or if a layer is formed the layer is not electrically insulative or electrically resistive.

Placing the cathodic material on a support structure, rather than in a liquid melt, may form and maintain a non-homogenous distribution. For example, a concentration of the cathodic material can differ from a point nearer the separator relative to a point further from the separator. In an alternative embodiment, the support structure may include a plurality of cathodic materials, one of which has a different activation voltage relative to another. In such an alternative embodiment, the support structure may function as a state-of-charge indicator.

The support structure may be porous. A suitable porous support structure may be a foam, a mesh, a weave, a felt, fibers, or whiskers. In one embodiment, the support structure may be a plurality of packed particles. Suitable support structures may include ceramics, cermets, glasses, and metals. Other suitable support structures may be formed from carbon. Suitable carbon foam may include reticulated vitreous carbon (RVC), commercially available from Electrosynthesis Co., Inc. (New York). Other suitable foam may be formed from ceramics or electrochemically inert metals.

Reticulated Vitreous Carbon (RVC) foam is an open cell foam material including vitreous carbon. Vitreous carbon includes an amorphous structure and combines some of the properties of glass with those of other industrial carbons such as carbon black, carbon fibers, or graphite. Unlike other carbonaceous materials such as graphite coatings and carbon fibers, RVC is isotropic in its material properties. RVC has an exceptionally low relative density (3%), high surface area, low resistance to fluid flow, and can withstand very high temperatures in non-oxidizing environments.

Suitable foam is commercially available in a wide range of pore size grades, ranging from less than about 5 pores per inch (PPI) to greater than about 10,000 pores per inch. In one embodiment, the RVC may have an average pore size in a range of from about 5 pores per inch to about 100 pores per inch, from about 100 pores per inch to about 1500 pores per inch, from about 1500 pores per inch to about 2000 pores per inch, from about 2000 pores per inch to about 2500 pores per inch, from about 2500 pores per inch to about 3000 pores per inch, from about 3000 pores per inch to about 3500 pores per inch, from about 3500 pores per inch to about 4000 pores per inch, from about 4000 pores per inch to about 4500 pores per inch, from about 4500 pores per inch to about 7500 pores per inch, from about 7500 pores per inch to about 8000 pores per inch, from about 8000 pores per inch to about 10,000 pores per inch, or greater than about 10,000 pores per inch. In an alternative embodiment, the RVC may be compressed down to ⅕ its original volume enabling an even greater specific surface area (i.e., surface area per unit mass).

TABLE 1

| Physical Characteristics of RVC Foam (3% Nominal Density) | | |
|---|---|---|
| Compression Strength* | 40-170 psi | (0.28-1.20 MPa) |
| Tensile Strength* | 25-150 psi | (0.17-1.02 MPa) |
| Modulus of Elasticity* | $4.5\text{-}9 \cdot 10^3$ psi | (31-62 MPa) |
| Shear Modulus* | $4.4 \cdot 10^3$ psi | (30.3 MPa) |
| Hardness | 6-7 Mohs | |
| Specific Heat | $0.3$ BTU $\cdot$ lb$^{-1}$ $\cdot$ °F.$^{-1}$ | ($1.26$ J $\cdot$ g$^{-1}$ $\cdot$ °C.$^{-1}$) |
| Bulk Thermal Conductivity | $0.25\text{-}0.35$ BTU $\cdot$ in $\cdot$ ft$^{-2}$ $\cdot$ hr$^{-1}$ $\cdot$ °F.$^{-1}$ | ($0.33\text{-}0.50$ W $\cdot$ m$^{-1}$ $\cdot$ °C.$^{-1}$) |
| Coefficient of Thermal Expansion: | | |
| 0-100° C. | $1.2 \cdot 10^{-6} \cdot$ in $\cdot$ in$^{-1}$ $\cdot$ °F.$^{-1}$ | ($2.2 \cdot 10^{-6} \cdot$ m $\cdot$ m$^{-1}$ $\cdot$ °C.$^{-1}$) |
| 100-1000° C. | $1.8 \cdot 10^{-6} \cdot$ in $\cdot$ in$^{-1}$ $\cdot$ °F.$^{-1}$ | ($3.2 \cdot 10^{-6} \cdot$ m $\cdot$ m$^{-1}$ $\cdot$ °C.$^{-1}$) |
| Bulk Resistivity | $12.7 \cdot 10^{-2} \cdot$ ohm $\cdot$ in | ($5 \cdot 10^{-2} \cdot$ ohm $\cdot$ cm) |
| Temperature Limitations: | | |
| in air | 600° F. | (315° C.) |
| in non-oxidizing environment | 1800° F. | (1000° C.) |

*Varies with pore size (PPI)

The cathodic material is consumed by an electrochemical reaction front beginning from the region closest to the separator and progressing away from the separator. In embodiments where the cathodic material coaxially surrounds the separator, the surface area of the reaction front increases as the front moves radially outward. The reaction rate decreases as the reaction front progresses outward due to increasing ionic resistivity. Creating a gradient of cathodic material so that the concentration of cathodic material increases as resistivity increases may stabilize the reaction rate.

In embodiments where the cathodic material is contained within the separator, the reaction front progresses inward from nearest the separator inner surface. Therefore, the surface area of the reaction front decreases as it progresses inward. The change in surface area may affect performance of the energy storage device due to the decreasing amount of available cathodic material. In other embodiments, this surface area effect may be mitigated or eliminated by creating a concentration gradient of available cathodic material that increases radially inward toward the axis.

As noted above, the cathodic material and other components may have graded concentrations with respect to axial or radial position on the support structure depending on the cell configuration. The cathodic material concentration can be a function of position on the support structure. As the electrochemical reaction can be controlled with reference to the reaction front of cathodic material, the cathodic material furthest from the separator may be the last cathodic material consumed—and as such may be formed from a material having a different activation voltage, and one that is detectably different from the main bulk of cathodic material. The concentration gradient may be linear, non-linear, or may be stepped with respect to axial and/or radial position. In some embodiments, such gradient concentration distribution may enable a more stable energy storage device, or may enable an energy storage device having a substantially flat discharge profile regardless of state of charge (SOC). In other embodiments, such gradients may function as a state of charge indicator.

Embodiments in which the support structure includes one or more plates may maintain a cathodic material concentration differential between adjacent regions or zones. The plates may be used either with or without a porous support structure. The plate-based support structure may include at least one transverse plate transecting the axis and defining at least a first axial region and a second axial region. The plate may serve as a physical barrier to mass and/or charge carrier flow within the volume of the main separator. In another embodiment, the support structure is a series of plates that define axial regions and/or radial zones.

The plates may be a continuous, porous support that blocks ionic flow and/or electrical flow from one region to another region. In one embodiment, the axial region may be defined by an axially concentration gradient of cathodic material, or of an additive. If the gradient is continuous, an arbitrary concentration may be selected as the region boundary with reference to, for example, a state of charge. If the gradient is a step gradient, then the region may be defined by the step change alone.

One or more plates may engage a surface of the separator via a sealing structure. The sealing structure may be the same as a sealing structure used to seal a lid to the housing, if present. Suitable sealing structures may include a glassy composition. Suitable glassy compositions may include one or more of phosphates, silicates, or borates. Other suitable sealing structures may include a cermet.

With reference to the radial zones, such zones may be defined by coaxially spaced cylinders, or by a concentration gradient of cathodic material. Like the axial regions, the zones may be defined by the presence or the amount of other materials as well, such as additives.

A suitable cathodic material may include at least one cathodic material present in elemental form, in salt form, or in both elemental and salt form. The elemental form may be present in an amount ranging from about 1 weight percent to about 99 weight percent based on the total weight of the elemental and salt forms. The salt form may be present in an amount ranging from about 99 weight percent to about 1 weight percent based on the total weight of the elemental and salt forms. According to one embodiment the weight percent ratio of the cathodic metal in element form to that of the cathodic metal in salt form is based on the state of charge of the electrochemical cell. The cathodic metal may include zinc, copper, iron, nickel, or any combination thereof. In one embodiment, the cathodic metal consists essentially of zinc. In some embodiments, a current collector may be in electrical communication with the cathodic material.

According to some embodiments the cathodic material may further include one or more additives. Additives suitable for use in the cathodic material can include tungsten, titanium, niobium, molybdenum, tantalum, and vanadium or any combination thereof in any appropriate oxidation state. The cathodic metal may be present relative to the one or more additives by a ratio that is less than about 100:1. The cathodic metal may be present relative to the one or more additives by a ratio that is greater than about 1:100. The one or more additives may include a solid solution with the cathodic metal, may be sequestered in the cathodic metal or both dissolved in and sequestered in the cathodic metal.

The salt forms of the cathodic material may include metal halides. In one embodiment, the halide may include chlorine, iodine, fluorine, or any combination thereof. In some embodiments, the halide may consist essentially of chlorine. Furthermore, some embodiments may include mixed metal halides wherein one or more metals are present in a plurality of oxidation states simultaneously.

The salt form of the cathodic metal may include an electrolyte. In some embodiments an electrolyte may include salts of metals that differ from the cathodic and/or anodic metals. The electrolyte may contain additives such as sulfur and/or phosphorus-containing additives, and metal halides such as nickel halide, copper halide, and tin halide. In one embodiment, the electrolyte may be disposed within a chamber.

One embodiment includes a ternary electrolyte. A ternary electrolyte may include the cathodic metal in salt form, the anodic metal in salt form, and a third metal in salt form at an operating temperature that is sufficiently high to melt the salts. For example, the ternary electrolyte may include $ZnCl_2$:NaCl:$AlCl_3$. In one embodiment, the ternary electrolyte consists essentially of $ZnCl_2$:NaCl:$AlCl_3$. Accordingly, the salt form of the third metal may include aluminum. Suitable ratios of $ZnCl_2$ to NaCl to $AlCl_3$ can have the $ZnCl_2$ content up to about 19 weight percent at operating temperatures below 320 degrees Celsius. As the concentration of the aluminum chloride increases in the ternary system, the species of aluminum chloride becomes predominantly $Al_2Cl_7^-$. The aluminum chloride may be present in an amount greater than an amount of NaCl based on weight. A sulfur or a phosphorus-containing additive may be disposed in the electrolyte. For example, an appropriate additive may include triphenyl sulfide.

Another embodiment includes a binary electrolyte. Suitable binary electrolytes may include $ZnCl_2$ and another salt, such as NaCl. At operating temperatures, the zinc salt is more than 20 weight percent soluble in the other salt melt. In one embodiment, the zinc salt has a solubility ranging from about 20 weight percent to about 35 weight percent, from about 35 weight percent to about 50 weight percent, from about 50 weight percent to about 75 weight percent, or from about 75 weight percent to about 99 weight percent. In one embodiment, the solubility is about 100 weight percent of the $ZnCl_2$ in the other salt.

Embodiments having a $ZnCl_2$ rich melt (i.e. more than about half by weight) are acidic and can form Lewis acid groups. At about 1.7 V, aluminum converts to aluminum metal, so a cell containing aluminum chloride electrolyte may have a lower cut-off voltage of about 1.7 volts to avoid damage to the cell. In some embodiments, as the $ZnCl_2$ content increases the lower cut-off level may decrease, or may become unnecessary. Accordingly, some embodiments including binary or ternary electrolytes may be able to use the full voltage range of zero to about 2.6 volts, rather than a window of 1.7 volts to 2.6 volts.

A suitable anodic material may include at least one anodic metal present in elemental form, salt form, or both elemental and salt form. The elemental form of the anodic metal may be present in an amount ranging from about 1 weight percent to about 99 weight percent based on the total weight of the elemental and salt forms. The salt form of the anodic metal may be present in an amount ranging from about 1 weight percent to about 99 weight percent based on the total weight of the elemental and salt forms. According to one embodiment the weight percent ratio of the anodic metal in element form to that of the anodic metal in salt form is based on the state of charge of the electrochemical cell. The anodic metal may include lithium, sodium or any combination thereof. In one embodiment, the anodic metal consists essentially of sodium. In some embodiments, a current collector may be in electrical communication with the anodic material.

In one embodiment, the anodic material may include one or more additives. Additives suitable for use in the anodic material can include oxygen scavengers including titanium, manganese, zirconium, vanadium, aluminum or any combination thereof in any appropriate oxidation state. The anodic metal may be present relative to the one or more additives by a ratio that is less than about 100:1. The anodic metal may be present relative to the one or more additives by a ratio that is greater than about 1:100. The one or more additives may be dissolved in the anodic metal, in contact with the anodic metal or both dissolved in and in contact with the anodic metal.

According to some embodiments, the level of molten anodic metal varies as a function of state of charge. Therefore, some embodiments are capable of tracking or determining the state of charge by sensing the level of the molten anodic metal. Furthermore, a suitable controller may be capable of using anode head height data to control and/or regulate the performance of the electrochemical cell.

In one embodiment, the housing may have a cross-sectional profile that is square, polygonal, or circular. Furthermore, suitable housings may have a length to width ratio in a range of from about 1:10 to about 10:1. The housing may include a material selected from metal, ceramic, or polymer. The metal may be selected from nickel metal and nickel alloys or ferrous-based metals and alloys. The ceramic may include any of a variety of suitable metal oxides. The polymer may include a thermoplastic or thermoset having the capacity to withstand normal operating temperatures and conditions.

Figure 1:
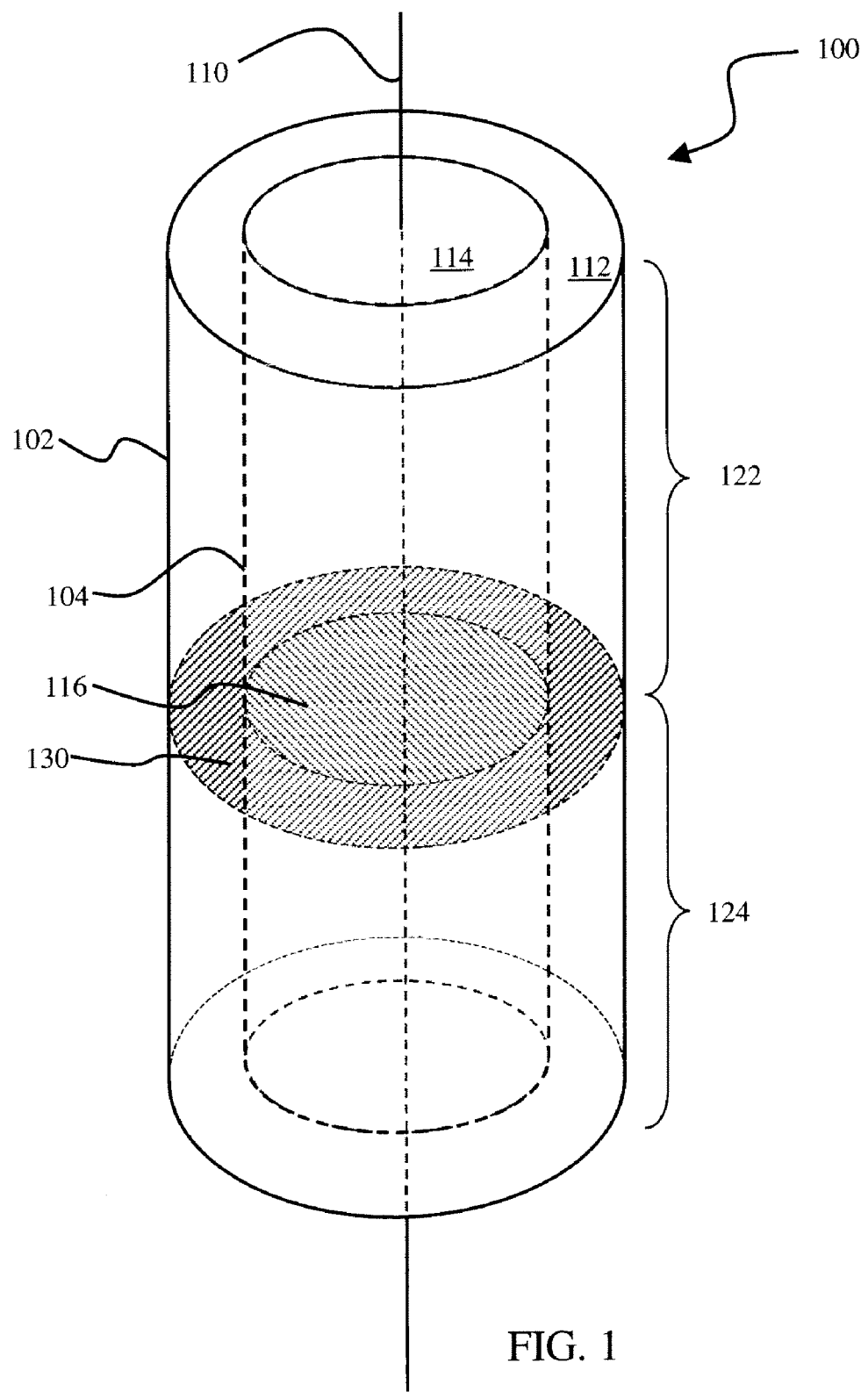
FIG. 1 is a perspective view of an embodiment of the invention.

An article 100 illustrating an embodiment of the invention is shown in FIG. 1. In the article, the concentration and/or type of cathodic material differs axially through a volume defined by an interior surface of a separator. The article 100 includes a cylindrical housing 102 and separator 104, each having a circular cross sectional profile and defining an axis 110. The housing has an inner surface (not indicated with a reference number) that defines a total space 112. The separator has an inner surface (not indicated with a reference number) that defines a volume 114. A plate 116 is transverse to the axis and divides the volume into two regions: axial region one 122, and axial region two 124. In the illustrated embodiment, the concentration of cathodic material has a step change as the transition from region one to region two, and the cathodic material is disposed on a porous support structure. The plate is continuous and seals against the inner surface of the separator. Accordingly, the plate functions as a boundary between regions having differing composition concentrations. In other embodiments, additional plates may be added so as to create additional axial regions. Similarly, other embodiments may include a plurality of plates in lieu of the porous support.

During use, anodic material flows through the separator from the volume 114 and into the remainder of the total space 112. Gravity causes the liquid anodic material to pool at the bottom and fill upwards as the state of charge of the article changes. The concentration gradient of the anodic material, then, across the separator may differ from the top of the cell relative to the bottom of the cell. An optional support ring 130 is discontinuous and allows the flow of anodic material therethrough.

The illustrated embodiment may be prepared by impregnating the support structure and then inserting the support structure into the separator. The separator can then be sealed to a lid (not shown) to seal the cathodic material in the cell. Alternatively, the support structure can be placed bare into the separator and then the cathodic material can be flowed into the support structure thereby to impregnate. By filling to a certain height and allowing cathodic materials to cool, additional and different cathodic materials can be poured into support structure to create a layer cake effect. If plates are used, fill holes may allow for differing cathodic materials to be filled into differing axial regions.

Figure 2A:
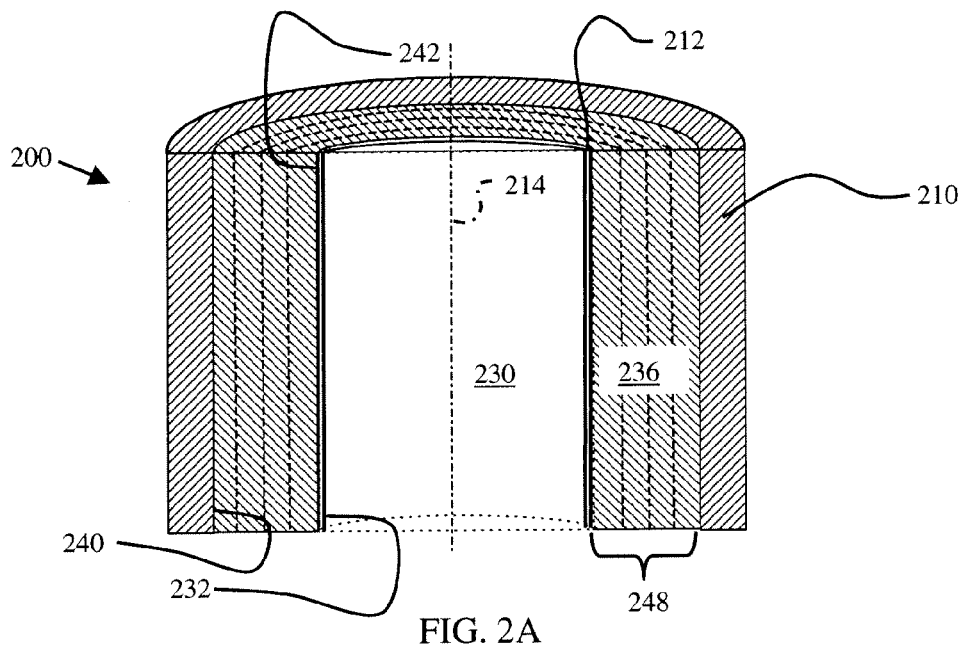
FIG. 2A is a cross-sectional schematic side view of an embodiment of the invention.
Figure 2B:
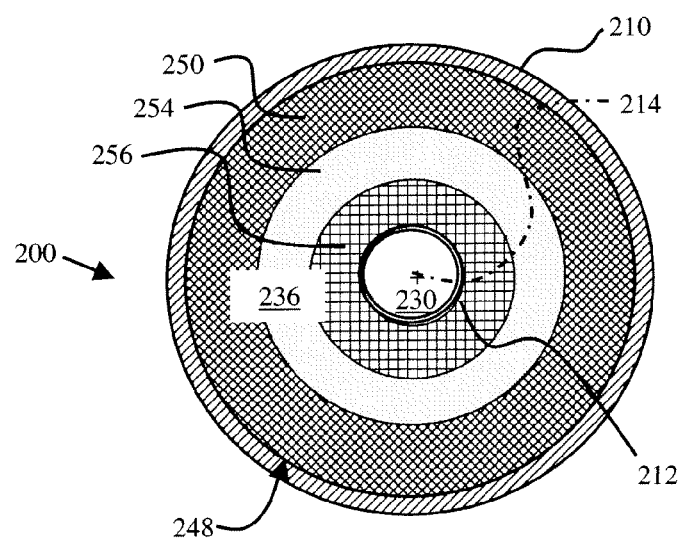
FIG. 2B is a cross-sectional schematic top view of the structure of FIG. 2A.

An embodiment of the invention illustrating a radial zone arrangement is shown in FIGS. 2A and 2B. An article 200 includes an elongate housing 210 and a separator 212 that define an axis 214. Each of the housing and separator have a circular cross sectional profile, and are nested so that the separator is disposed in a coaxial relation within the housing. An anode chamber 230 is defined by the inner surface 232 of the separator. A cathode chamber 236 is defined by the inner surface 240 of the housing and an outer surface 242 of the separator. A porous foam support structure 248 is disposed within the cathode chamber. The cathode chamber is divided into three radial zones 250, 252, 254, which extend inward toward the axis. Each zone contains at least one cathodic material supported on a surface of the porous support structure. The concentration (amount) and the type(s) of the cathodic material differ discontinuously as a function of radial distance from the outward from the axis. In this illustrated embodiment, for example only, innermost radial zone 256 includes only zinc at a first concentration that is homogeneous throughout the radial zone. The middle radial zone 254 includes zinc and copper in equal amounts at a second concentration—the total of which is the same as the first concentration; the distribution of which is forms an inverse gradient in which the portion of the radial zone adjacent to the innermost radial zone is 100 percent zinc, 0 percent copper and the opposing side of the middle radial zone is 100 percent copper and 0 percent zinc. The outermost radial zone 250 includes copper overlaying aluminum, where each are continuous layers and are homogeneous throughout the outermost radial zone. The aluminum, once exposed may function as a state of charge indicator—being chemically available only when the copper overcoating layer has reacted.

The illustrated embodiment may be assembled by the formation of three separate support structures, prepared independently, and then nested together and inserted into the housing.

Figure 3:
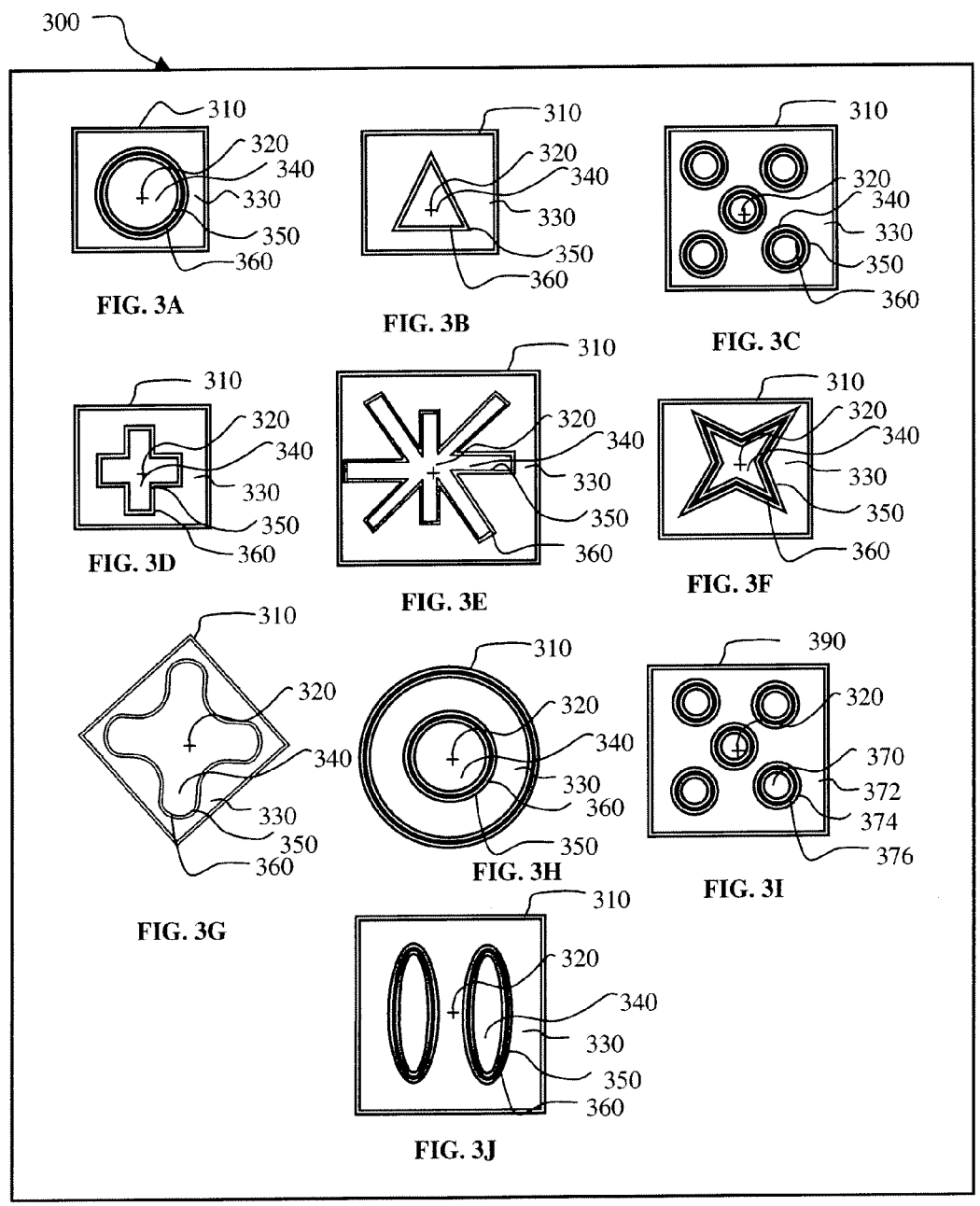

With reference to FIG. 3, a plurality of energy storage device architectures are shown (FIGS. 3A to 3J) to illustrate various design choices. The same reference numbers are used throughout FIG. 3A to FIG. 3J to indicate functionally analogous parts. These same numbers may be repeated in other Figs. for the same purpose. Accordingly, the collection 300 includes energy storage devices having an elongate housing 310 that defines an axis 320. An inner surface of the housing walls defines a volume. The volume includes an anode 330 and a cathode 340, which are separated physically from each other by a separator 350 and a wick 360. The wick is disposed on an outward facing surface of the separator and conducts liquid anodic material over the separator surface for transport across the separator. In some embodiments the separator is a closed space, capped at each end, defining two chambers within the volume. An inner chamber and an outer chamber.

FIG. 3A shows a basic cell having a cylindrical separator 350 containing an anodic material and surrounded by a cathodic material. The cathodic material is consumed starting from the surface closest to the separator and moving outward. Therefore, the surface area of the reaction front increases as the reaction proceeds. The separator defines an inner chamber 340 and is disposed within a housing 310. The space between the outward facing surface of the separator 350 and the inward facing surface of the housing 310 defines an outer chamber 330. FIGS. 3B, 3D, and 3F show similar arrangements where the separator varies in cross-sectional shape. FIG. 3D sets forth a separator that is shaped so that as the cathodic material is consumed during use the surface area of the unused material does not appreciably change. Accordingly, FIG. 3D may be regarded as a constant surface area configuration. The configuration of FIG. 3E is also a constant surface area configuration similar to that of 3D, but 3E has a larger surface area. Other similar shapes may be fabricated to further enhance or enlarge surface area of the separator.

FIG. 3C shows a cell having a plurality of separators each defining a separate anodic core. The cross-sectional shape may be any other appropriate or convenient shape such as polygonal, oval or ellipse, star, or cross-shaped. A plurality of smaller cathodic cores may create relatively greater surface area than a single cathodic core having the same total volume.

FIG. 3I sets forth a cell configuration where the anode and cathode are reversed in relation to FIG. 3A-3H. In this case the inner chamber 370 contains a cathodic material rather than an anodic material. The outer chamber 372 contains the anodic material. In this embodiment the separator 376 has a wick 374 on an inner surface of the separator 376. According to this embodiment, five separators are included; however, a smaller or greater number is also within the scope of the invention. Embodiments such as this one, which have an anodic material adjacent to the housing, could result in oxidation of the housing unless the housing material is selected such that it has a sufficiently high oxidation potential relative to that of the anodic material. Accordingly, a zinc cathode may be used with a nickel housing.

Alternatively, the housing could include an insulating barrier between the anodic material and the housing. The housing material is not limited by oxidation potential when the housing inner surface is lined with an insulating barrier layer. As an alternative to the insulating barrier layer, the housing could be made from a high-melting non-metallic material such as a ceramic or an appropriate polymer.

According to some embodiments, the cathode material may be deposited on a foamed support. In another embodiment, the support material may support the separator, as shown in FIG. 3I. Such support may decrease or eliminate damage caused by thermal cycling, pressure differentials, and vibrations.

With reference to FIG. 3J, two cross-sectionally oval separators are provided. As shown in FIG. 3J, embodiments having even numbers of separators need not have a separator centrally located within the housing. Rather, an axis of the housing may be located between two or more separators.

A plurality of the electrochemical cells can be aligned into an energy storage system. Multiple cells can be arranged in series or parallel to form a stack. The ratings for the power and energy of the stack may depend on such factors as the stack size or number of cells in the stack. Other factors may be based on end-use application specific criteria.

Various embodiments of the energy storage device can store an amount of energy that is in a range of from about 0.1 kiloWatt hours (kWh) to about 100 kWh. One embodiment of the energy storage device has an energy-by-weight ratio of greater than 100 Watt-Hours/kilogram, and/or an energy-by-volume ratio of greater than 160 Watt-Hours/liter. Another embodiment of the energy storage device has a specific power rating of greater than 150 Watts/kilogram.

Suitable energy storage devices may have an application specific Power to Energy ratio of less than 10 to 1. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the specific power to energy ratio is in range from about 1:1 to about 1:2, from about 1:2 to about 1:4, from about 1:4 to about 1:6, from about 1:6 to about 1:8, or from about 1:8 to about 1:10.

Some embodiments may include a controller for communicating with the plurality of cells and regulating their output. The controller may be capable of distributing an electrical load to selected cells in a cell stack in response to feedback signals from the cells indicating their states of charge. According to some embodiments, the controller may be operable to perform a re-warming method in which one or more heating elements are energized in a predetermined sequence to melt a frozen portion of the energy storage device.

Suitable controllers may include a proportional-integral-derivative controller (PID controller). The controller may be capable of measuring a value from a process or other apparatus and comparing it with a reference setpoint value. The difference (i.e. "error" signal) may be used to adjust one or more inputs of the process in order to bring the process' measured value back to its desired setpoint.

Some embodiments may include a component or subsystem for preventing molten portions of the device from freezing, i.e. a freeze guard system. A freeze guard system suitable for use in an embodiment of the invention can include a eutectic additive that depresses the freeze point of a matrix material. In another embodiment, a freeze guard system may include at least one additive that affects the melt profile and/or changes the thermal expansion character of the matrix. In still other embodiments a freeze guard system may include a heater having a thaw profile that can maintain a minimal heat level sufficient to prevent freezing of cell reagents. Other embodiments may include a heat management device or subsystem, which is capable of warming the energy storage device if it is too cold, and cooling the energy storage device if it is too warm.

Another embodiment provides an energy management system including a dual energy storage device. A suitable dual energy storage device may include a first energy storage device, and a second energy storage device differing from the first energy storage device. In some embodiments, the first energy storage device may have a higher power to energy ratio. In some embodiments, the second energy storage device may have a lower power to energy ratio. Accordingly, in some embodiment the first energy storage device may be capable of releasing large amounts of energy quickly for short durations, and the second energy storage device may be capable of releasing smaller amounts of energy slowly over longer times. Some embodiments may enhance energy storage efficiency, and/or may enhance power delivery. A suitable controller may be capable of drawing from and recharging either energy storage device as needed.

A suitable second energy storage device for power enhancement may include, without limitation, a lithium ion battery, a nickel metal hydride, or an ultracapacitor. A suitable lithium ion battery may include a lithium polymer battery. In one embodiment, the second energy storage device may include a zinc matrix battery.

EXAMPLES

The following examples are intended only to illustrate methods and embodiments in accordance with the invention, and as such should not be construed as imposing limitations upon the claims. Unless specified otherwise, all components are commercially available from common chemical suppliers such as Alpha Aesar, Inc. (Ward Hill, Mass.), Spectrum Chemical Mfg. Corp. (Gardena, Calif.), and the like.

Example 1

Preparation of Electrode

Several metal-coated carbon foam electrodes, measuring 1.25 cm×1.25 cm×2 mm thick, are prepared by electroplating foamed carbon with a copper layer, a zinc layer, or a nickel layer, as appropriate. The carbon foam is obtainable from ERG Materials and Aerospace Corp. (Oakland, Calif.). The foam electrodes have a carbonaceous skeleton of reticulated vitreous carbon (RVC) foam. The carbon foam pore density is 100 pores per inch (PPI) and the pore diameter is about 100 micrometers on average.

The electroplating is performed in an aqueous copper, zinc, or nickel solution, as appropriate. The plating encapsulates the carbon foam to form the prepared metal-coated porous electrode substrates. Several of the nickel-coated porous electrodes are further submersed in a zinc solution and zinc metal is plated onto the nickel layer to form a dual metal cathode. Several of the copper-coated porous electrodes are further submersed in a zinc solution and zinc metal is plated onto the copper layer to form a dual metal cathode.

The finished metal-coated carbon foam electrodes are analyzed and characterized. The surface of the copper-coated electrode substrates appears smooth and shiny at 200 times enlargement in an optical microscope. The effective copper density is about 0.01 g/cm$^3$. The surface of the nickel-coated electrode substrates appears smooth and shiny at 200 times enlargement in an optical microscope. The effective nickel density is 0.01 g/cm$^3$.

The surface of the zinc-coated-nickel electrode substrates appears dull and nodular at 200 times enlargement in an optical microscope. The effective zinc density is 0.49 g/cm$^3$. The plated metal of the zinc on nickel electrode is about 0.2 micrometers thick, and the working electrode has a rectangular cross sectional thickness of 1.5 centimeters, and a depth of 2 millimeters.

The zinc-coated porous electrode is cycled through charges and discharges in a $ZnCl_2$:NaCl melt at 100 mA/cm$^2$. The charging curve is shown in FIG. 4. The potential curve is indicated with reference letter "a", and the charge is indicated with reference letter "b".

An additional set of electrodes, measuring 1.25 cm×1.25 cm×2 mm thick, are prepared by electroless plating of a copper layer or a zinc layer onto a support structure of foamed nickel and commercially available cobalt coated foamed nickel. The nickel foam is obtainable from Inco Limited (Toronto, Cananda) and from Marketech International Inc. (Port Townsend, Wash.). The foam electrodes have a nickel foam skeleton. The density is about 0.45 g/cm$^3$; the surface area density is about 500 g/sq. meter; the porosity is 95 percent, and the pore size is about 40 ppcm (100 ppi).

Example 2

Preparation of a Separator

A plurality of separators are prepared. The plurality includes two groups of separators, each having a differing stabilizer phase type. The two different zirconia phase types include (i) 8 mol. % $Y_2O_3$ stabilized cubic phase zirconia (8YSZ) and (ii) 4.5 mol. % $Y_2O_3$ stabilized tetragonal and cubic phase zirconia (4.5YSZ).

The separators formed using the stabilized zirconia are formed as three types of discs. The three types of discs include two types of (i), and one type of (ii). The three samples sets are characterized as having compositions of: (a) 50 vol. % α-alumina+50 vol. % 8 YSZ; (b) 70 vol. %. α-alumina+30 vol. % 8 YSZ; and (c) 50 vol. % α-alumina+50 vol. % 4.5 YSZ. Disc-shaped samples of 2.5 millimeters (mm) thickness of compositions (a), (b), and (c) are fabricated using requisite powder mixtures, die-pressing, followed by isostatic pressing, and then sintering in air at 1600 degrees Celsius. The sintered discs are placed in a powder mixture. The powder mixture has a composition of 8.85 wt. % $Na_2O$, 0.75 wt. % $Li_2O$, and 90.45 wt. % $Al_2O_3$. The disks-in-powder are calcined at 1250 degrees Celsius for 2 hours to form sodium-β"-alumina, and serves as the source of sodium and lithium oxides during reaction. Samples are maintained at 1450 degrees Celsius for 2 hours to about 16 hours. The samples are cross-sectioned and the thickness of sodium-β"-alumina formed is measured.

One sample of composition (a) is further heat-treated at 1450 degrees Celsius for a longer time (32 hours) to ensure that it is fully converted into Na-beta-alumina all the way through. Conductivity (σ) was measured in a range of from about 200 degrees Celsius to about 500 degrees Celsius. The activation energy is measured to be about 15.7 kilojoule per mole (kJ/mol). Conductivity at 300 degrees Celsius is 0.0455 siemens per centimeter (S/cm) (resistivity of 22 ohm-centimeters (Ωcm)). This sample has 50 vol. % zirconia. Also, the grain size of Na-beta-alumina is a few micrometers. The measured conductivity is consistent with reported values for Na-beta-alumina of a fine-grained structure.

Example 3

Formation of a Test Cell, and Testing Thereof

A composite separator tube, cylindrical in shape, is formed according to the process of Example 2 using composition (a). The cylinder dimensions are 228 mm length, 36 mm internal diameter, and 38 mm outside diameter. The composite separator tube is glass sealed to an alpha alumina collar. The assembly is placed in a stainless steel can. The can size is about 38 mm×38 mm×230 mm. The composite separator contains 50 grams (g) Cu, 22 grams NaCl, and 25 grams $NaAlCl_4$. In addition, 11 grams of reticulated vitreous carbon is added to the cathode to prevent settling of CuCl between charge and discharge. An electric heater surrounds the cell. During operation, the cell is heated to the operating temperature of 300 degrees Celsius. The cell is charged and discharged at currents of 4 amps and of 12 amps. After a few cycles of charge and discharge, the cell is shut down, cooled and inspected. Micrographic examination of the separator grains indicates no copper impregnation into the interstices.

A reference electrode is sodium metal sealed in a beta alumina tube. The current collector is a 0.5-mm Pt wire, which extends through the tube wall and is wetted by the anodic material (Na) during operation. The working electrode is the zinc coated nickel electrode from Example 1. The secondary electrode is a nickel only coated foam electrode.

The current collectors for the working electrodes and for the secondary electrodes are rectangular paddles formed from titanium, and which have the same cross-section shape and area as the foam-based electrodes. The paddles are spot-welded to 1-mm Ti wires. Several pieces of non-woven, borosilicate-glass-fiber filter media (Whatman GF/C) are stacked to a thickness of 0.15 centimeters (cm). Additional glass filter media is positioned on the backsides of the Ti paddles. A spring is fashioned by bending a length of 1-mm titanium wire into a W shape. This spring presses on the backsides of the titanium paddles, placing the entire assembly under slight compression. The addition glass media on the backsides of the paddle provides electrical insulation so that the spring does not create an electrical pathway between the two electrodes.

The connecting wires of the three electrodes pass through a PTFE tapered plug, which fits into a center neck of the flask. The sodium electrode, which is moisture sensitive, is connected last, using a $N_2$ purged dry glove bag. The wires are adjusted so that the foam electrodes are fully immersed in molten salt. The sodium reference electrode is adjacent, but external, to the working/secondary electrode assembly.

The external wire ends are connected to a computer-interfaced galvanostat (PARSTAT 2273 available from AMETEK Princeton Applied Research (Oak Ridge, Tenn.) and constant current data are measured. The working electrode is first oxidized for 3600 seconds at 100 milliamps (mA), then reduced at 400 milliamps for 900 seconds. Open-circuit potential relative to Na is measured as 2.077 volts. The charging voltage is 2.17 volts and the discharge voltage is 2.02 volts. When all the Zn is depletes from the Ni coated foam, the open circuit voltage is 2.58 volts.

Example 4

Forming a Test Energy Storage Device

An energy storage device is formed using a beta"-alumina tube and a copper tube. The beta"-alumina tube has an internal diameter of 6.5 mm, outside diameter of 8.6 mm, and an overall length of 68 mm. The copper tube is sized and shaped to receive the beta"-alumina tube. The copper tube has an internal diameter of 12.7 mm. The beta"-alumina tube is placed inside of the copper tube. In addition to the copper tube, 1.2 grams of sodium chloride and 3.4 grams of the electrolyte AlCl3:NaCl are placed in the space between the beta"-alumina tube inner surface and the copper tube outer surface. Inside the beta"-alumina tube are placed 0.2 grams of sodium in contact with a 1 mm diameter nickel wire (as a current collector).

The energy storage device body and the nickel current collector inside of the beta"-alumina tube are connected to a PAR potentiostat/galvanostat Model 2273. An electric heater surrounds the energy storage device. During testing, the heater (and subsequently the energy storage device) are heated to the operating temperature of 300 degrees Celsius.

After an initial charge cycle at a current of 0.025 A to a total charge of 1360 coulombs, the energy storage device is charged and discharged 140 times at a current of 0.5 A (61.8 mA/cm$^2$). The charge per cycle is 500 coulombs. The voltage between the terminals of the battery is oscillated between approximately 2 volts and 3.2 volts upon cycling. No increase in cell resistance is observed.

Example 5

Forming a Test Energy Storage Device

Two energy storage devices are built, and each includes a commercially obtainable cylindrical beta"-alumina tube. These tubes did not contain a stabilizer, and each tube has sodium aluminate present in between grains, and the grains were of substantial size. Each tube has an inner diameter of 36 mm, outside diameter of 38 mm, and an overall length of 228 mm. A nickel foil is thermal compression bonded to an alpha alumina collar. The beta"-alumina tube is glass sealed to the foil coated alpha alumina collar to form an assembly. This assembly is placed inside a square stainless steel housing with approximate dimensions of 38 mm×38 mm×230 mm. The assembly is welded to the housing to make a hermetic seal. The nickel foil and alpha alumina collar defines an aperture in the assembly. The beta"-alumina tube is filled with cathodic material and other material through the aperture. The inside of the beta"-alumina tube is filled with 100 grams of copper, 44 grams of sodium chloride, 1 gram of aluminum, and 48 grams of electrolyte in the form of NaAlCl$_4$. A nickel rod is placed in the center of the beta"-alumina tube in contact with the anodic material to function as a current collector. The aperture is covered with a metal cap. The cap is welded to the collar to make a completely sealed cell.

The theoretical capacity of this cell is 20.18 amp-hours. An electric heater surrounds the energy storage device. Switching on the heater, the temperature of the housing is ramped to an operating temperature of about 350 degrees Celsius. After an initial low current charge cycle at a current of 2.0 amps to a total charge of 17.95 amp-hours (64,620 coulombs), the energy storage device is charged and discharged at currents of 2 amps and 4 amps (the equivalent of 6 amps and 12 amps for a full cell).

The voltage of both energy storage devices is similar to each other, and is flat through the discharge cycle. The capacity of these cells depends on temperature: at 300 degrees Celsius an equivalent 2 amp discharge results in 2.25 amp-hours and at 380 degrees Celsius a 2 amp discharge provides 8.75 amp-hours.

The test cells have relatively lower resistance and lower resistance rise vs. amp-hours charged. After only a few cycles each beta"-alumina tube cracked. The copper migrates up to about ⅓ the distance through the wall of the beta"-alumina tube.

Example 6

Forming a Test Energy Storage Device

An energy storage device is produced in the same fashion as the energy storage devices of Example 5, except 11 grams of carbon are added to the cathodic material. The added carbon prevents settling of CuCl during a charge mode of operation and a discharge mode of operation. An electric heater surrounds the energy storage device. The heater is activated to heat the energy storage device to an operating temperature of about 300 degrees Celsius.

After an initial constant-voltage charge cycle at a current of 3 to 15 amps to a total charge of 10 amp-hours, the energy storage device is charged and discharged at currents of 4 amps and at 12 amps. The charge performance of this cell is about the same as the charge performance of the energy storage devices of Example 4. The discharge voltage is also about the same. A difference relative to the energy storage devices of Example 4 is the utilization of the CuCl on discharge is higher—85% compared to ~50% average of the Example 4 devices. After only a few cycles, the separator tube cracked. The copper migrates up to about ⅓ the distance through the wall of the beta"-alumina tube.

Example 7

Forming a Test Energy Storage Device

In the same manner as in Example 6, an energy storage device is built, except the beta"-alumina tube differs. The beta"-alumina tube in this Example is fabricated by a vapor phase impregnation process. The beta"-alumina tube has less sodium aluminate in grain interstitial phases relative to the tubes used in Examples 5 and 6. The performance of the energy storage device of this Example is similar to the energy storage devices of Example 6. A difference is that after use, there is no copper impregnation or migration into the wall of the beta"-alumina tube.

As used herein, cathodic material is the material that supplies electrons during charge and is present as part of the redox reaction as more than about 5 percent by weight of the participating electrochemical reactants on its side of the reaction. Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

The embodiments described herein are examples of compositions, structures, systems and methods having elements corresponding to the elements of the invention recited in the claims. This written description enables one of ordinary skill in the art to make and use embodiments having alternative elements that likewise correspond to the elements of the invention recited in the claims. The scope thus includes compositions, structures, systems and methods that do not differ from the literal language of the claims, and further includes other compositions, structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

What is claimed is:

1. An article, comprising:
   a separator having a first surface that defines at least a portion of a first chamber, and a second surface that defines a second chamber, and the first chamber is in ionic communication with the second chamber through the separator; and
   a cathodic material in electrical communication with the separator and capable of forming a metal halide,
   a support structure disposed within at least one of the first chamber or the second chamber, and the support structure is electrically conductive and in electrical communication with a current collector, wherein the cathodic material is supported on a surface of the support structure,
   wherein the article is elongate and defines an axis, and the article is configured so that the axis is about vertical during use so that there is an up axial direction and a down axial direction,
   and the support structure is disposed in a cathodic-material containing chamber and the support structure comprises a plurality of plates that ring the axis and are spaced axially from each other.

2. The article as defined in claim 1, wherein the support structure is a continuous matrix.

3. The article as defined in claim 1, wherein the support structure extends away from the separator first surface to form a layer having a thickness that is in a range of from about 0.1 millimeters to about 20 millimeters.

4. The article as defined in claim 1, wherein the separator is about planar and has a peripheral edge.

5. The article as defined in claim 4, wherein the separator is flat, undulate, domed or dimpled.

6. The article as defined in claim 1, wherein the separator has a cross-sectional profile normal to the axis that is an ellipse, a triangle, a rectangular, a cross, or a star.

7. The article as defined in claim 1, wherein the separator has a cross-sectional profile normal to the axis that is a circle, cloverleaf, or square.

8. The article as defined in claim 1, wherein the second chamber is disposed entirely within the first chamber.

9. The article as defined in claim 1, wherein the support structure comprises a ferrous-based alloy.

10. The article as defined in claim 1, wherein the support structure comprises ceramic.

11. The article as defined in claim 1, wherein the support structure comprises carbon.

12. The article as defined in claim 11, wherein the carbon support structure is vitreous carbon.

13. The article as defined in claim 1, wherein the support structure is a metal.

14. The article as defined in claim 13, wherein the cathodic material is zinc, and the support structure is a metal selected from the group consisting of copper, nickel, molybdenum, tungsten, and titanium.

15. The article as defined in claim 13, wherein the cathodic material is copper, and the support structure is a metal selected from the group consisting of nickel, molybdenum, tungsten, and titanium.

16. The article as defined in claim 1, wherein the support structure is porous.

17. The article as defined in claim 16, wherein the porous support structure is a foam, mesh, weave, mat, or mass of fiber.

18. The article as defined in claim 1, wherein the porous support structure is powder.

19. The article as defined in claim 16, wherein the support structure pores have an average diameter that is greater than about 1 micrometer.

20. The article as defined in claim 16, wherein the support structure pores have an average diameter that is less than about 250 micrometers.

21. The article as defined in claim 16, wherein the support structure pores have an average diameter that is in a range of from about 10 micrometers to about 50 micrometers.

22. The article as defined in claim 16, wherein the support structure has a specific surface area of greater than about 0.1 m$^2$/g.

23. The article as defined in claim 16, wherein the support structure has a specific surface area of less than about 10 m$^2$/g.

24. The article as defined in claim 16, wherein the support structure has a volume density that is less than about 30 percent.

25. The article as defined in claim 16, wherein the support structure pores have an average diameter that is selected based on a grain size of a grain formed by the electrochemical conversion of cathodic material from salt form to elemental form, or formed by the electrochemical conversion of the conductive ion from elemental form to salt form.

26. The article as defined in claim 1, wherein the support structure is coated with the cathodic material by chemical vapor deposition, electroless plating, powder coating, or by dip coating.

27. The article as defined in claim 1, wherein the support structure is coated with the cathodic material by electroplating.

28. The article as defined in claim 1, wherein the support structure has an effective density of cathodic material supported thereon that is greater than about 0.01 grams per cubic centimeter.

29. The article as defined in claim 1, wherein the support structure has an effective density of cathodic material supported thereon that is greater than about 0.5 grams per cubic centimeter.

30. The article as defined in claim 1, wherein the support structure supports a layer of cathodic material that has a thickness that is greater than about 0.2 micrometers.

31. The article as defined in claim 1, wherein the support structure supports a layer of cathodic material that has a nodular appearance at about 200-times enlargement.

32. The article as defined in claim 1, wherein the support structure supports a layer of cathodic material that is continuous.

33. The article as defined in claim 1, wherein the support structure comprises a plurality of sublayers.

34. The article as defined in claim 33, wherein the plurality of sublayers comprise at least one of a bond layer or adhesive layer, a conductive layer, a corrosion resistant layer, or a state of charge indicator layer; and an active layer as an outermost layer, and the active layer comprises the cathodic material.

35. The article as defined in claim 33, wherein the plurality of sublayers comprises an active layer, and the active layer comprises two sublayers of differing cathodic materials.

36. The article as defined in claim 1, wherein the cathodic material on the support structure surface is adjacent to the first surface of the separator and extends away therefrom.

37. The article as defined in claim 1, wherein the plates define axial regions of cathodic material, and the plates are continuous, electrically insulative and are configured to electrically isolate one axial region from another axial region.

38. The article as defined in claim 1, wherein the plates define axial regions of cathodic material, and the plates are discontinuous but block settling of at least some material from one axial region to another axial region.

39. The article as defined in claim 1, further comprising a current collector that extends through the plurality of plates.

40. The article as defined in claim 1, wherein the second chamber is elongate and defines an axis.

41. The article as defined in claim 40, wherein the first chamber is coaxially disposed about the axis.

42. An article, comprising:
a separator having a first surface that defines at least a portion of a first chamber, and a second surface that defines an elongate second chamber defining an axis, and the first chamber is in ionic communication with the second chamber through the separator; and
a cathodic material in electrical communication with the separator and capable of forming a metal halide,
a support structure disposed within at least one of the first chamber or the second chamber, and the support structure is electrically conductive and in electrical communication with a current collector, wherein the cathodic material is supported on a surface of the support structure wherein there are at least two regions spaced axially relative to each other, and at least one of:
the concentration of an additive differs from region one relative to region two, or
the type of cathodic material differs from region one relative to region two, or
the amount of cathodic material differs from region one relative to region two, or
there is a plurality of cathodic materials present in each region, and the ratio of a first cathodic material to a second cathodic material differs from region one relative to region two.

43. The article as defined in claim 42, further comprising a plate that separates region one from region two.

44. The article as defined in claim 43, wherein the plate is about flat and transverse to the axis.

45. The article as defined in claim 43, wherein the plate is about conical and opens upward, wherein relatively heavier or denser materials migrate or flow down along an inner surface of the plate towards the axis.

46. The article as defined in claim 43, wherein the plate is about conical and opens downward, wherein relatively heavier or denser materials migrate or flow down along an outward-facing surface of the plate away from the axis.

47. The article as defined in claim 41, wherein there are at least two zones spaced radially relative to each other, and at least one of:
the concentration of an additive differs from zone one relative to zone two, or
the type of cathodic material differs from zone one relative to zone two, or
the amount of cathodic material differs from zone one relative to zone two, or
there is a plurality of cathodic materials present in each zone, and the ratio of a first cathodic material to a second cathodic material differs from zone one relative to zone two.

48. An energy storage device comprising the article as defined in claim 1.

49. An article, comprising:
a separator having a first surface that defines at least a portion of a first chamber, and a second surface that defines a second chamber, and the first chamber is in ionic communication with the second chamber through the separator; and a cathodic material in electrical communication with the separator and capable of forming a metal halide,
a support structure that is a continuous matrix and that is disposed within at least one of the first chamber or the second chamber, wherein the cathodic material is supported on a surface of the support structure;
wherein there are at least two regions spaced axially relative to each other, and at least one of:
the concentration of an additive differs from region one relative to region two, or
the type of cathodic material differs from region one relative to region two, or
the amount of cathodic material differs from region one relative to region two, or
there is a plurality of cathodic materials present in each region, and the ratio of a first cathodic material to a second cathodic material differs from region one relative to region two.

* * * * *